United States Patent [19]

Stein

[11] Patent Number: 4,993,953

[45] Date of Patent: Feb. 19, 1991

[54] DISPLAY HOLDER FOR FRAME AND MAT SELECTION

[76] Inventor: Linda C. Stein, 1139 Ivy Wall Dr., Houston, Tex. 77079

[21] Appl. No.: 425,680

[22] Filed: Oct. 23, 1989

[51] Int. Cl.[5] .............................................. G09B 25/00

[52] U.S. Cl. ...................................... 434/365; 434/367

[58] Field of Search ............... 434/365, 367, 368, 370, 434/72, 42.9, 415; 40/152, 152.1, 585; 248/454, 455, 456, 444.1, 453, 449

[56] References Cited

U.S. PATENT DOCUMENTS

| | | | |
|---|---|---|---|
| 1,757,032 | 5/1930 | Wilson | 434/429 |
| 2,144,562 | 1/1939 | Croninger et al. | 248/454 X |
| 3,798,798 | 3/1974 | Shore | 434/365 X |
| 3,858,335 | 1/1975 | Shore | 434/365 |
| 4,098,009 | 7/1978 | Flynn | 248/444.1 X |
| 4,402,673 | 9/1983 | Nash | 434/365 |
| 4,423,563 | 1/1984 | Ondricek | 40/152 X |
| 4,618,119 | 10/1986 | Powell | 248/456 |
| 4,672,758 | 6/1987 | Le-Carpentier et al. | 40/152.1 |
| 4,771,976 | 9/1988 | Su | 248/456 X |
| 4,848,243 | 7/1989 | Giordano | 248/455 X |
| 4,877,213 | 10/1989 | Lambert | 248/454 X |

*Primary Examiner*—Richard J. Apley
*Assistant Examiner*—Rachel M. Healey
*Attorney, Agent, or Firm*—Kenneth A. Roddy

[57] ABSTRACT

A display holder for displaying proposed arrangements of pictures, artwork, mats, picture frames, and the like, has a base support and a generally rectangular display base pivotally connected to thereto and a transparent rectangular cover/holding member pivotally connected to the display base to substantially cover the front surface of the display base with its corners aligned with the corners of the base. Guide lines on the front surface of the display base aid in strategically placing flat materials such as artwork, posters, photographs, mat corner samples, etc., on the display base. Clips on the cover/holding member allow flat materials such as mat samples to be releasably secured firmly against the cover/holding member. Flat materials are placed on the front surface of the display base and the transparent cover/holding member closed thereon and sample mat materials are secured on the front surface of the cover/holding member. An inclination adjustment member between the display base and the base support allows the assembled display to be raised and supported at selective angles relative to a vertical plane and sample picture frame materials may be placed on the corners of the display base and cover/holding member for properly viewing the displayed articles. An extension member may be connected to the base support which has a horizontal support member positionable in front of the bottom edge of the cover/holding member for receiving and supporting flat and three dimensional materials in front of the cover/holding member.

15 Claims, 5 Drawing Sheets

10
11
18
19
20
21
22
22
23
23
24
25
25
26
27
27
28
29
29
29
30
30
31
31
34
35
36

DISPLAY HOLDER FOR FRAME AND MAT SELECTION

BACKGROUND OF THE INVENTION

1. FIELD OF THE INVENTION

This invention relates generally to display holders, and more particularly to a display holder for assisting in the viewing and selection of picture frame corner samples, mat corner samples, flat materials, or three dimensional materials.

2. BRIEF DESCRIPTION OF THE PRIOR ART

Picture frame shops commonly have a specific area for their customers to view picture frame corner samples and/or the corner samples of mats used in picture framing. These corner samples are placed on artwork or flat materials. The standard practice is to visually present the artwork in a horizontal position on large tables that are covered in a carpet-like material. Occasionally, the large table will have a slight angle built into it. However, customers are required to stretch their bodies over the area to properly view the creative sample compositions in making their selection.

Often, customers will bring in flat materials which have been rolled into cylinders. When the materials are placed on the table, they tend to roll up. To prevent this, the shop owner must place various objects on the materials which will obscure the composition, and make the selection more difficult.

Metal and wooden moulding picture frame corner samples are available in most picture frame shops, however, these samples occasionally come apart from repeated showings. Some have been known to come apart on top of the customers artwork. Sometimes, the customers own jewelry or hands will touch the artwork or flat materials in the process of making the selection of the proposed corner samples. Such actions often cause unrepairable damage to the artwork or flat materials. These situations arise because there is nothing readily available to cover the artwork or flat materials, and still allow a clear view.

For years, picture frame designers have been faced with the problem of keeping the picture frame mat corners samples spaced evenly at the desired dimensions if more than one mat was to be considered. If a true vertical view of the desired picture framing material is needed, it is necessary to physically hold up the artwork, the mat corner samples, and the picture frame sample.

Some picture framers try to place their customers art pieces with mat and corner samples on some type of board which is then placed on a large easel for viewing. The samples are usually hand held or clipped to the board or artwork, and occasionally magnets are used. The magnets and heavy clips tend to clutter the design. This technique also requires storage space for the frequently used large easels.

In creating mat designs for the artwork, a designer likes to relate his or her ideas using the exact locations of lines and cutouts which will be used on the mats for that particular job. The lines and cutouts are almost impossible to show on every color choice since there are hundreds available. Usually, the designer has to show a singular basic sample of a non-related color in hopes that the customer can visualize the total outcome of the custom job. Thus, it would be desirable to have an apparatus whereby a designer could place a desired mat color over flat material and show placement of various lines on the mat color, or show where desired changes on the flat material will or should occur without harming the mat color or the flat material.

If a purchaser is able to view a poster, photograph, artwork, or the like in its ultimate position with a clear view of color choices, styles of frames, and exactly how they will fit the composition, it would be much easier to finalize any type of picture frame sale. It would therefore be beneficial to both the customer, and the framer, to have a reasonably priced, easily operated device which can be placed in a near vertical position and has a clear protective cover and a means for securely holding mat and frame corner samples.

U.S Pat. No. 4,445,870 discloses an apparatus which utilizes a mirror above the artwork to give the customer an illusion of what the proposed corner samples will look like when completed. This apparatus does not allow the picture frame moulding corner sample to fit tightly against the chosen mat samples. It is also difficult for the shop owner or sales person to view the composition from the rear.

The present invention is distinguished over the prior art in general by a display holder for displaying proposed arrangements of pictures, artwork, mats, picture frames, and the like, having a base support and a generally rectangular display base pivotally connected to thereto and a transparent rectangular cover/holding member pivotally connected to the display base to substantially cover the front surface of the display base with its corners aligned with the corners of the base. Guide lines on the front surface of the display base aid in strategically placing flat materials such as artwork, posters, photographs, mat corner samples, etc., on the display base. Clips on the cover/holding member allow flat materials such as mat samples to be releasably secured firmly against the cover/holding member. Flat materials are placed on the front surface of the display base and the transparent cover/holding member closed thereon and sample mat materials are secured on the front surface of the cover/holding member. An inclination adjustment member between the display base and the base support allows the assembled display to be raised and supported at selective angles relative to a vertical plane and sample picture frame materials may be placed on the corners of the display base and cover/-holding member for properly viewing the displayed articles. An extension member may be connected to the base support which has a horizontal support member positionable in front of the bottom edge of the cover/-holding member for receiving and supporting flat and three dimensional materials in front of the cover/holding member.

SUMMARY OF THE INVENTION

It is therefore an object of the present invention to provide a display device which will allow a person to view a complete composition of picture frame samples or proposed frame concepts as closely as they would appears in their finished state.

It is another object of this invention to provide a display device for viewing artwork, mat, and frame samples which is lightweight and easily portable.

Another object of this invention is to provide a display device for viewing artwork, mat, and frame samples which is durable, easily maintained, and does not require expensive replacement parts or repairs.

Another object of this invention is to provide a display device for viewing artwork, mat, and frame samples which will maintain artwork, mat corner samples, picture frame corner samples and other materials in a flat position while being viewed.

Another object of this invention is to provide a display device for viewing artwork, mat, and frame samples which will prevent damage to the artwork and other materials while being viewed.

Another object of this invention is to provide a display device for viewing artwork, mat, and frame samples which will allow corner samples of the mat to be secured at the desired position and spacing while being viewed.

Another object of this invention is to provide a display device for viewing artwork, mat, and frame samples which will allow one to use dry erasable markers to draw concepts relating to locations of lines and cutouts which will be used on the completed job.

Another object of this invention is to provide a display device for viewing artwork, mat, and frame samples which has a protective cover which will not break or scratch easily when marked on and is easily cleaned.

A further object of this invention is to provide a display device which may be positioned in a near vertical position for better perception of artwork, mat, and frame samples.

A still further object of this invention is to provide a display device which is simple in construction, economical to manufacture, and reasonably priced.

Other objects of the invention will become apparent from time to time throughout the specification and claims as hereinafter related.

DESCRIPTION OF THE PREFERRED EMBODIMENT

Figure 1:
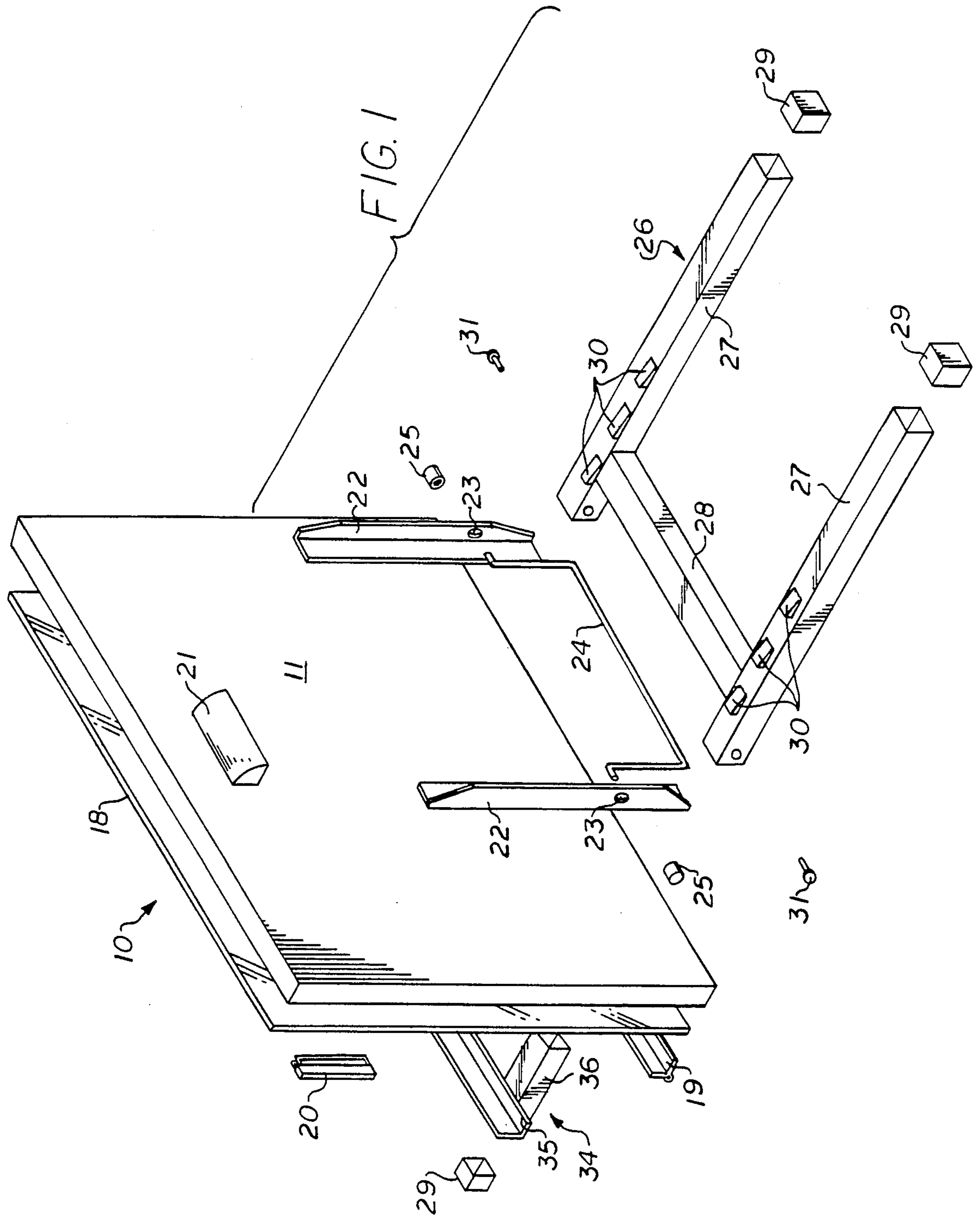
FIG. 1 is an exploded isometric view of the display device in accordance with the present invention shown from the rear.

Referring to the drawings by numerals of reference, there is shown a preferred display device 10. In FIG. 1, the components are shown exploded for a more complete understanding of the construction of the invention.

The display device 10 has a base member 11 preferably constructed of balsa wood or plastic foam of uniform cross section which is laminated with a smooth plastic veneer. The preferred base is a generally rectangular configuration ranging from about 18"×24" to 40"×60" in overall dimension and having a thickness of approximately 3/16" to ½".

Figure 2:
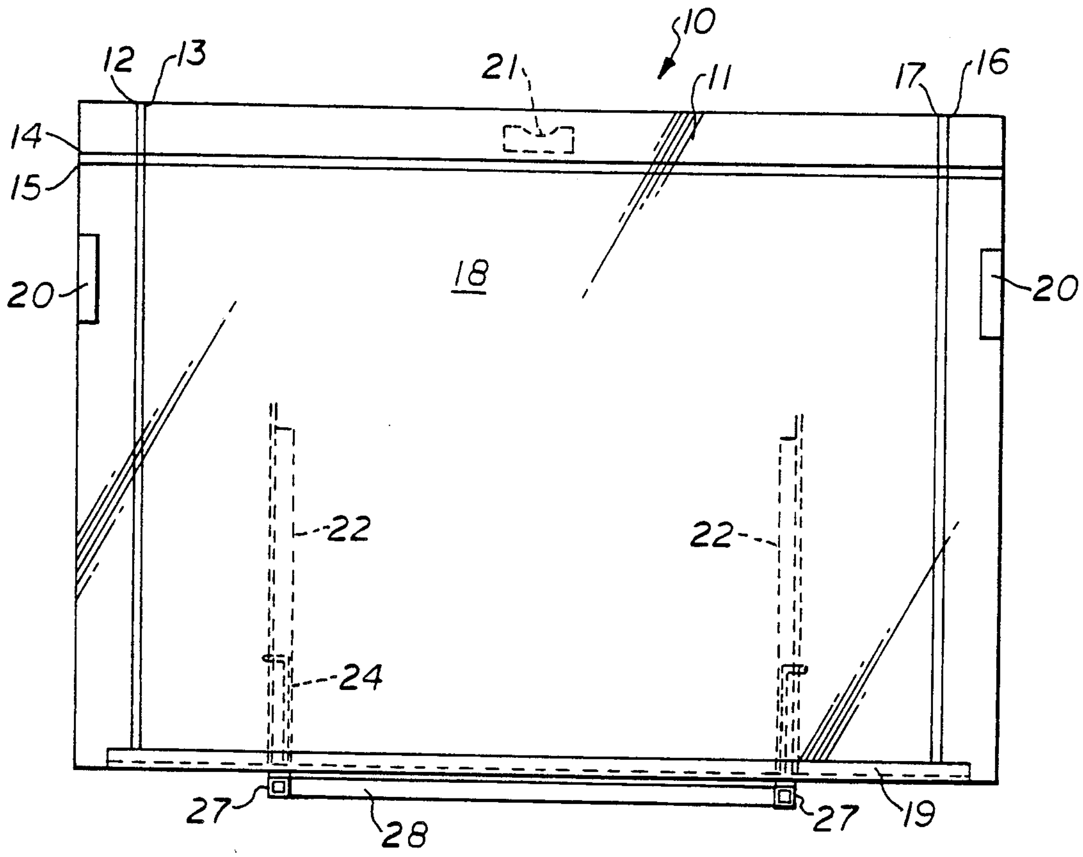
FIG. 2 is a front elevation of the display device.
Figure 3:
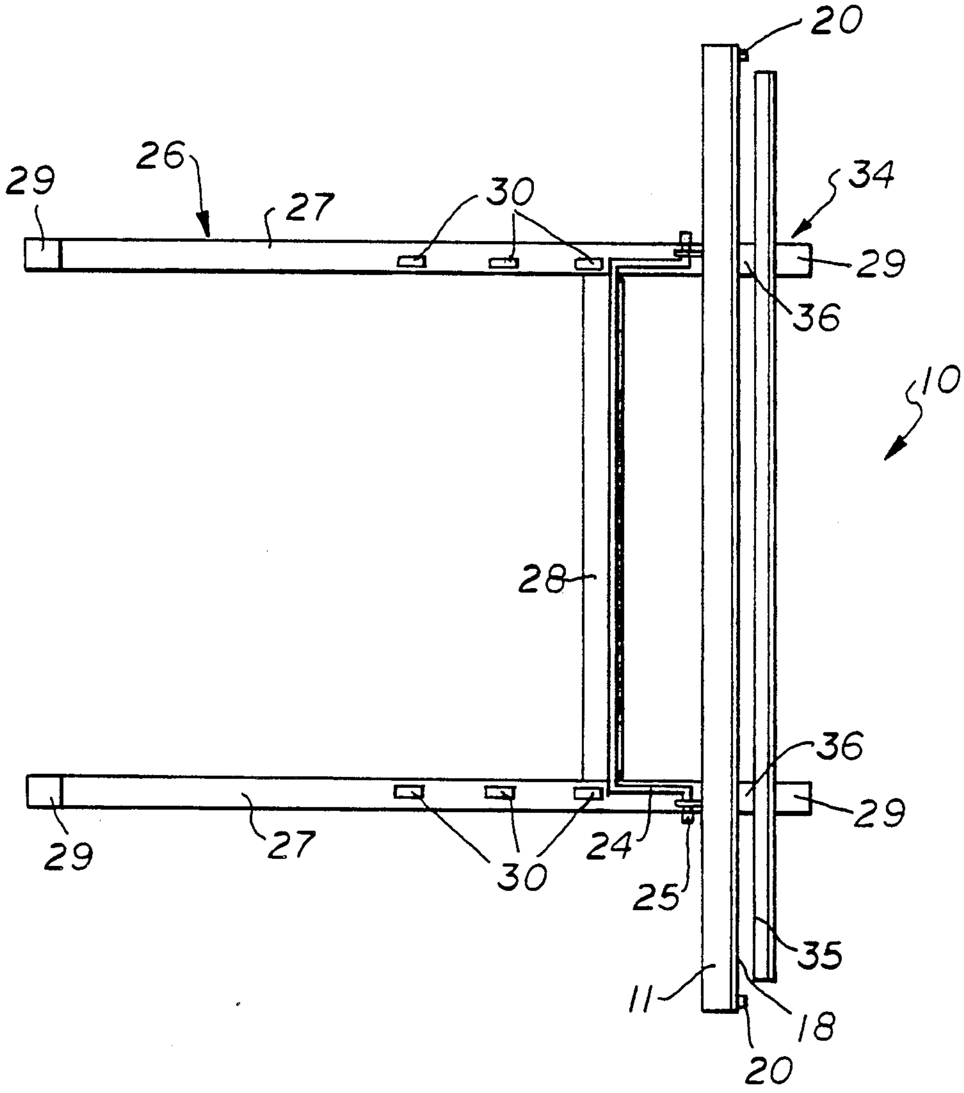
FIG. 3 is a top plan view of the display device.

As best seen in FIG. 2, the front surface of the base member 11 is provided with a plurality of guide lines 12–17 superimposed thereon. Guide line 12 is a vertical line spaced approximately 2¾" inwardly from and parallel to the left side of the base 11 and extending from the top to the bottom of the base. Guide line 13 is a vertical line spaced approximately ¼" inwardly from and parallel to guide line 12 or approximately 3" inwardly from the left side of the base 11 and extending from the top to the bottom of the base. Guide line 14 is a horizontal line spaced approximately 2¾" inwardly from and parallel to the top side of the base 11 and extending from the left to the right side of the base. Guide line 15 is a horizontal line spaced approximately ¼" inwardly from and parallel to guide line 14 or approximately 3" inwardly from the top side of the base 11 and extending from the left to the right side of the base. Guide line 16 is a vertical line spaced approximately 2¾" inwardly from and parallel to the right side of the base 11 and extending from the top to the bottom of the base. Guide line 17 is a vertical line spaced approximately ¼" inwardly from and parallel to guide line 16 or approximately 3" inwardly from the right side of the base 11 and extending from the top to the bottom of the base.

Figure 1A:
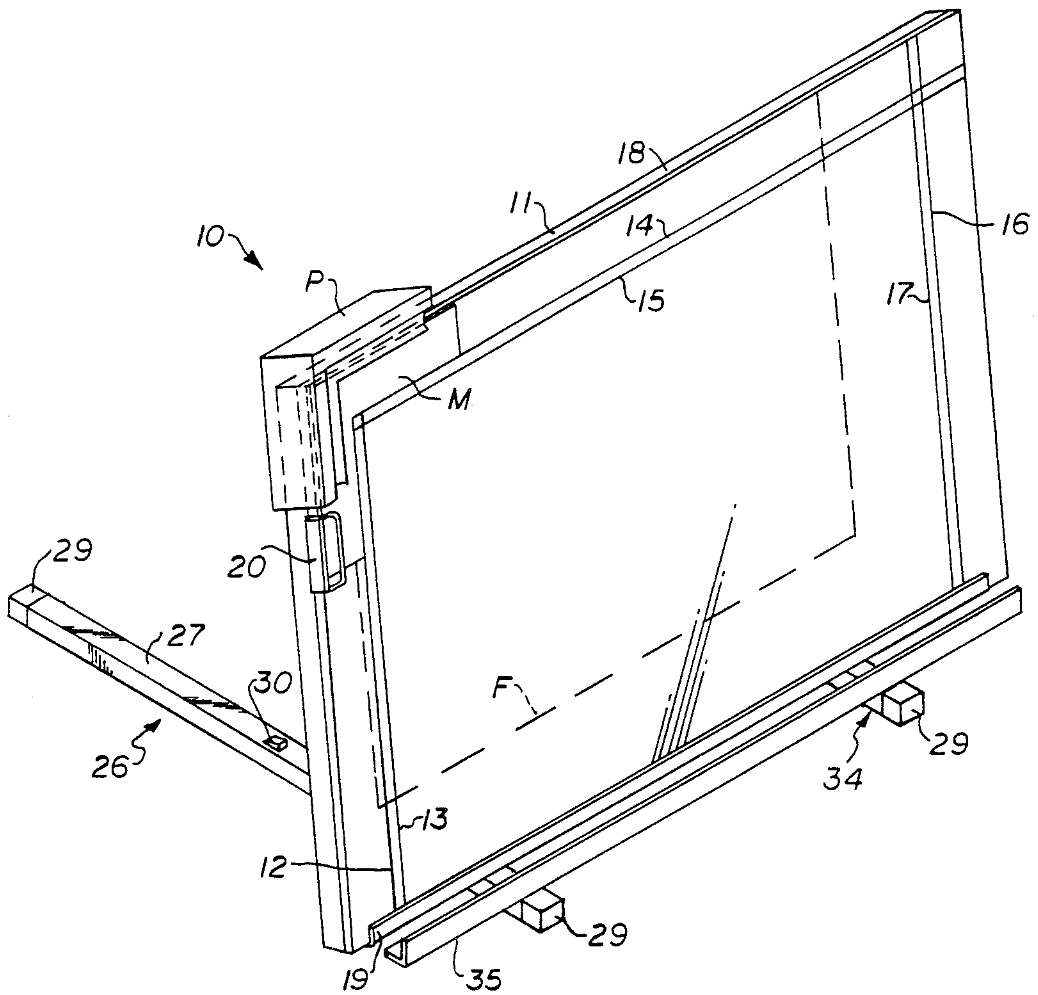
FIG. 1A is an isometric view of the display device shown from the front.

As shown in FIG. 1A, the guide lines 12–17 are used to gauge the placement of mat corner samples M. They are also used as a guide in placing flat materials F, such as artwork, posters, photographs, etc., evenly on the base 11. The outer four corners of the base 11 are preferably squared and serve as a means for holding and supporting corner samples of picture frame P.

A transparent cover/holding member 18 formed of rigid plastic material such as a sheet of acrylic plastic is pivotally connected at its bottom end to the bottom end of the base 11 by a hinge 19. The hinge 19 may be secured to the cover/holding member 18 and base 11 by adhesive or other suitable mounting hardware. The size of the cover/holding member 18 is approximately the same size as the base 11, such that it will substantially cover the base and its corners will fit evenly with the corners of the base to insure a proper support for holding picture frame corner samples. A preferred plastic material is one which is suitable for use with dry marker pens and is easily erased.

A pair of flat clips 20 are mounted on the left and right side edges of the cover/holding member 18. The clips 20 are mounted between the top and bottom edges at a location to grip the mat corner samples. More than two clips may be used if needed for larger mat samples and clips may be mounted on the top and bottom edges of the cover/holding member 18. The preferred clips 20 are formed of bent metal wire so that the object being clipped is not obscured. It is also preferred that the clips be placed near the corners of the cover/holding member 18 so that the mat samples will be held flat so that the picture frame corner samples will fit tightly over the mat samples in the corners.

The back side of the base 11 has a handle 21 secured thereon near the top side edge for raising and lowering the base. A pair of opposed L-shaped angle members 22 are secured vertically to the backside of the base 11 in laterally opposed relation. A pair of holes 23 are formed in the upstanding leg of each angle member 22. A brace bar 24 is formed of wire or small diameter rod bent into a wide generally U-shape with the outer ends extending laterally outward. The outwardly extending ends of the brace bar 24 are received through the holes 23 in the angle members 22 and the brace bar is pivotally maintained between the angle members 22 by a resilient tip 25 installed on the outer ends of the brace bar 24.

A horizontal, generally H-shaped base support 26 is formed of a pair of laterally spaced tubular members 27 joined by a tubular crossmember 28 secured transversly therebetween. The base support tubular members 27 are formed of square tubing and have open ends. The open ends of the members 27 each receive a protective end cap or tip 29. The tips 29 are formed of a resilient material such as rubber to prevent skidding. The top surface of the base support members 27 are provided with a series of longitudinally spaced raised stops 30.

Figure 4:
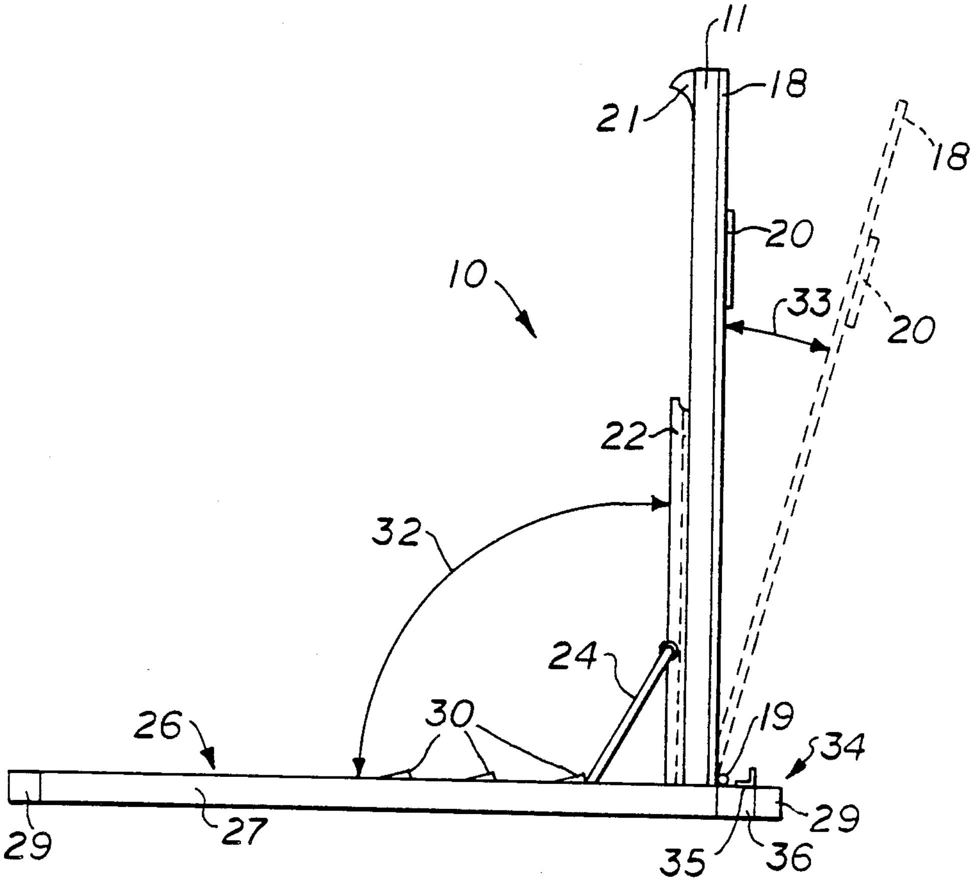
FIG. 4 is a side elevation of the display device.

The display base is pivotally attached to the base support 26 by placing the angle members 22 adjacent the base support tubular members 27 and passing screws 31 through holes (not shown) formed through the members 22 and 27. As seen in FIG. 4, the base 11 may be pivotally raised or lowered relative to the base support 26 (indicated by line 32) and placed in a desired angle relative to vertical by engaging the brace bar 24 on the appropriate stop 30. As indicated by line 33, the cover/-holding member 18 may also be pivoted outward and downward relative to the base 11.

Optionally, the base support 26 may be provided with an extension member 34. The extension member 34 is formed of an elongate horizontal bar 35 having an L-shaped cross section with a pair of laterally spaced tubular leg extension members 36 secured to the bottom thereof axial alignment with the base support tubular members 27. The leg extension members 36 are smaller than the interior of the tubular base support members 27. Thus, the tips 29 at the forward end of base support tubular members 27 may be removed, and the leg extension members 36 may be slidably received inside the open end of the tubular members 27 to place the horizontal bar 35 a selectively adjustable distance in front of the cover/holding member 18. The resilient tips 29 are then installed on the forward ends of the leg extension members 36. In this manner, flat or three-dimensional objects may be supported in the horizontal bar member 35 just in front of the cover/holding member 18 when the base 11 is raised to a near vertical position. The extension member 34 may also be permanently attached to the base support member 26.

OPERATION

To use the display holder for displaying proposed arrangements of pictures, artwork, mats, picture frames, and the like, flat materials such as artwork, posters, photographs, mat corner samples, etc. are positioned against the guide lines on the front surface of the display base. The transparent cover/holding member is then closed over the flat samples on the display base. Other flat materials such as mat samples may be positioned on the cover/holding member and clipped thereon to hold them firmly against the cover/holding member. The display base is then raised and secured by the brace bar at the desired angles relative to a vertical plane and sample picture frame materials may be placed on the corners of the display base and cover/holding member for properly viewing the displayed articles. With the extension member connected to the base support, additional flat and three dimensional materials may be placed on the horizontal support member in front of the cover/holding member. If desired, additional notes or markings may be made over the arrangement by marking on the cover/holding member with dry marker pens.

While this invention has been described fully and completely with special emphasis upon a preferred embodiment, it should be understood that within the scope of the appended claims the invention may be practiced otherwise than as specifically described herein.

I claim:

1. Apparatus for displaying proposed arrangements of pictures, artwork, mats, picture frames, and the like comprising;

a base support, a square cornered generally rectangular display base of uniform cross section pivotally connected to said base support and having a series of guide lines on the front surface thereof at predetermined locations to aid in placing flat materials such as mat corner samples, artwork, posters, photographs, and the like at predetermined locations on said display base, inclination adjustment means operatively connected between said display base and said base support for positioning said display base at selective angle relative to a vertical plane, a square cornered generally rectangular cover/holding member formed of rigid transparent plastic material pivotally connected at its bottom end to the bottom end of said display base and sized to substantially cover the front surface of said display base with its corners aligned with the corners of said base, and one or more clip members on said cover/holding member for releasably securing flat materials such as mat samples firmly against said cover/holding member, whereby flat materials to be displayed may be placed on the front surface of said display base and said transparent cover/holding member closed thereon and sample mat materials secured on the front surface of said cover/holding member and the assembled display pivotally raised an supported at a selective angle relative to a vertical plane and sample picture frame materials placed on the corners of said display base and cover/holding member an extension member connected with said base support and having a horizontal support member moveably positioned at selected distances in front of the bottom edge of said cover/holding member for receiving and supporting flat and three dimensional materials in front of said cover/holding member.

2. The apparatus according to claim 1 in which said transparent cover/holding member plastic materials being suitable for use with dry marker pens and is easily erased.

3. The apparatus according to claim 1 in which said extension member is telescopically connected with said base support and said horizontal support member is selectively movable relative to said cover/holding member to adjust the distance therebetween for receiving and supporting flat and three dimensional materials of various thickness.

4. The apparatus according to claim 1 in which said base support comprises a pair of alterably spaced tubular members joined by a tubular crossmember secured transversely therebetween to form a generally H-shaped configuration.

5. The apparatus according to claim 4 in which said inclination adjustment means comprises a series of longitudinally spaced raised stops on the top surface of said tubular members, and a generally U-shaped brace bar having its outer ends pivotally secured to the backside of said display base, whereby said display base may be pivotally raised or lowered relative to said base support and said brace bar engaged in a selected stop to place said display base in a desired angle relative to a vertical plane.

6. The apparatus according to claim 4 in which said base support tubular members are formed of square tubing having open ends, and p1 protective end caps mounted on the open ends of said tubular members.

7. The apparatus according to claim 1 in which said display base is constructed of lightweight material having a smooth surface.

8. The apparatus according to claim 1 in which said display base is constructed of wood laminated with a smooth plastic veneer.

9. The apparatus according to claim 1 in which said display base is constructed of plastic foam material laminated with a smooth plastic veneer.

10. The apparatus according to claim 1 in which said series of guide lines comprise;

at least one vertical line spaced inwardly from and parallel to at least one side edge of said display base and extending from the top to the bottom of said display base, and at least one horizontal line spaced inwardly from and parallel to the top side edge of said display base and extending from the left to the right side of said base.

11. The apparatus according to claim 1 in which said series of guide lines comprise;

at least one vertical line spaced inwardly from and parallel to each side edge of said display base and extending from the top to the bottom of said display base, and at least one horizontal line spaced inwardly from and parallel to the top side edge of said display base and extending from the left to the right side of said base.

12. The apparatus according to claim 1 in which said series of guide lines comprise;

a first vertical line spaced inwardly from and parallel to the left side of said display base and extending from the top to the bottom of said display base, a second vertical line spaced inwardly from and parallel to said first vertical line and extending from the top to the bottom of said display base, a first horizontal line spaced inwardly from and parallel to the top side of said display base and extending from the left to the right side of said base, a second horizontal line spaced inwardly from and parallel to said first horizontal line and extending from the left to the right side of said base.

a third vertical line spaced inwardly from and parallel to the right side of said base and extending from the top to the bottom of said base, and a fourth vertical line spaced inwardly from and parallel to said third vertical line and extending from the top to the bottom of said base.

13. The apparatus according to claim 1 in which said one or more clip members are formed of bent metal wire.

14. The apparatus according to claim 1 in which said clips are mounted on the side edges of said cover/holding member and relative to the corners thereof at a location suitable for gripping mat corner samples such that the mat corner samples will be held flat and picture frame corner samples may be placed over at least one corner of the cover/-holding member and the mat corner sample.

15. The apparatus according to claim 1 including a handle on the back side of said display base for manually raising and lowering the base pivotally about its connection with said base support.

* * * * *